United States Patent
Birchall (10) Patent No.: US 8,719,061 B2
(45) Date of Patent: *May 6, 2014

(54) SYSTEM AND METHOD FOR REPAIR CALCULATION, REPLACEMENT CALCULATION, AND INSURANCE ADJUSTMENT

(75) Inventor: James T. Birchall, Southwick, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/555,587

(22) Filed: Jul. 23, 2012

(65) Prior Publication Data
US 2012/0290333 A1 Nov. 15, 2012

Related U.S. Application Data

(63) Continuation of application No. 11/582,719, filed on Oct. 18, 2006, now Pat. No. 8,229,767.

(51) Int. Cl.
  *G06Q 40/00* (2012.01)
(52) U.S. Cl.
  USPC .................................. 705/4; 705/35
(58) Field of Classification Search
  USPC .................................................. 705/4
  See application file for complete search history.

(56) References Cited

U.S. PATENT DOCUMENTS

| | | | |
|---|---|---|---|
| 4,989,144 A | | 1/1991 | Barnett, III |
| 5,432,904 A | * | 7/1995 | Wong ................................. 705/4 |
| 5,504,674 A | * | 4/1996 | Chen et al. ......................... 705/4 |
| 6,052,631 A | | 4/2000 | Busch et al. |
| 6,119,093 A | | 9/2000 | Walker et al. |
| 6,397,131 B1 | | 5/2002 | Busch et al. |
| 2002/0002475 A1 | | 1/2002 | Freedman et al. |
| 2002/0007289 A1 | | 1/2002 | Malin et al. |
| 2003/0046156 A1 | | 3/2003 | Cromer et al. |
| 2003/0154111 A1 | | 8/2003 | Dutra et al. |
| 2005/0043971 A1 | | 2/2005 | Henrickson et al. |
| 2006/0190317 A1 | | 8/2006 | Crockett |
| 2006/0242089 A1 | | 10/2006 | Vahidi et al. |

OTHER PUBLICATIONS

Insuring Your Home: A Guide for Consumers; Florida Department of Financial Services; (http:www.all-insurancedepot.com/files/15572798.pdf), 2005, 43 pages.
Net Present Value, Wikipedia (http:/en.wikipedia.org/w/index.php?title=Net_present_value&oldid=11628890), at least as early as Aug. 8, 2011, 2 pages.

* cited by examiner

*Primary Examiner* — Narayanswamy Subramanian
*Assistant Examiner* — Asha Puttaiah
(74) *Attorney, Agent, or Firm* — Howard IP Law Group, PC (57) ABSTRACT

Disclosed is a novel system and method that provides real time information to an insurance adjuster. The system obtains information related to an insured item which has an outstanding claim. Information includes the cost to repair a specific item, the salvage value of the item, and the cost to replace the item. The system then compares the information related to the insured item from an economic perspective to determine whether it should be repaired or replaced. Since the system is objective, it reduces the reliance on subjective human factors such as collusion and lack of expertise. As a result, the system reduces the number of fraudulent and inaccurate transactions related to the specific item.

16 Claims, 5 Drawing Sheets

SYSTEM AND METHOD FOR REPAIR CALCULATION, REPLACEMENT CALCULATION, AND INSURANCE ADJUSTMENT

CROSS-REFERENCE TO RELATED APPLICATIONS

This application is a continuation of co-pending U.S. patent application Ser. No. 11/582,719, entitled System and Method for Salvage Calculation, Fraud Prevention and Insurance Adjustment, filed Oct. 18, 2006, the entire contents of which are incorporated herein by reference for all purposes.

FIELD OF THE INVENTION

The present invention generally relates to the field of insurance. More specifically, the present invention relates to an improved system and method for determining the salvage value of items covered by a home insurance policy. In addition, the present invention relates to the reduction and prevention of fraudulent claims associated with items covered by a home insurance policy.

BACKGROUND OF THE INVENTION

Home insurance, or homeowners insurance, is an insurance policy that combines various personal insurance protections which include losses occurring to one's home and its contents. Further, homeowners insurance protects against the loss of the use of a home and loss of other personal possessions of the homeowner, as well as liability insurance for accidents that may happen at the home.

The cost of homeowners insurance often depends on what it would cost to replace the house and which additional riders (i.e., optional benefits indicating additional items to be insured) are attached to the policy. The insurance policy itself is a lengthy contract, and discloses what will and what will not be paid in the case of various events. Typically, claims due to earthquakes, floods, acts of God, or war are excluded.

The home insurance policy is usually a term contract (i.e., a contract that is in effect for a fixed period of time). In addition, insurance companies offer perpetual insurance (i.e., home insurance without a fixed term). The payment the insured makes to the insurer is called the premium, which must be paid each term. Most insurers charge a lower premium if it appears less likely the home will be damaged or destroyed. For example, if the house is situated next to a fire station, or if the house is equipped with fire sprinklers and fire alarms the corresponding premium will be lower than normal.

Generally, there are six standardized homeowners insurance forms in general and consistent use. The standardized forms are described below:

Homeowners Form 1 ("HO-1") is a limited policy that offers varying degrees of coverage for items specifically outlined in the policy. For example, this policy can be used to cover a valuable object found in the home, such as a painting.

Homeowners Form 2 ("HO-2") is similar to HO-1 in that it is a limited policy. However, a HO-2 policy covers specific portions of a house against damage. The coverage is usually a "named perils" policy, listing the events that are covered.

Homeowners Form 3 ("HO-3") is the most common policy for a homeowner. It is designed to cover all aspects of the home, structure and it contents as well as any liability that may arise from daily use as well as any visitors who may encounter accident or injury on the premises. Covered aspects as well as limits of liability are clearly spelled out in the policy to insure proper coverage.

Homeowners Form 4 ("HO-4") is commonly referred to as renters insurance. This policy covers those aspects of the apartment and its contents. This policy can also cover liabilities arising from accidents and intentional injuries for guests.

Homeowners Form 5 ("HO-5") covers a home, the homeowner, and its possessions as well as any liability that might arise from visitors or passers-by. This coverage is different from HO-3 in that it covers a wider breadth and depth of incidents and losses than an HO-3.

Homeowners Form 6 ("HO-6") is a form of supplemental homeowner's insurance known as condominium coverage. It includes coverage for the part of the building owned by the insured and for the property housed therein of the insured. It is designed to span the gap between what the homeowner's association might cover in a blanket policy written for an entire neighborhood and those items of importance to the insured. Typically the HO-6 covers liability for residents and guests of the insured in addition to personal property. The liability coverage, depending on the underwriter, premium paid, and other factors of the policy, can cover incidents up to 150' from the insured property, all valuables within the home from theft, fire or water damage or other forms of loss.

The insurance company is liable for any damage incurred to any property covered by any of the aforementioned policies. To determine the amount of damage to a property, the insurance company sends an authorized representative, usually an insurance adjuster. The adjuster takes an inventory of the damaged items and assesses the overall damage to the property. However, because insurance adjusters are not experts in property remediation, a third party remediation firm, SERVPRO® remediation services, SERVICEMASTER CLEAN® remediation services, or RAINBOW INTERNATIONAL® remediation services, is hired to help assess the damage. In addition, insurance adjusters are not available in all areas. As a result, insurance companies or insured's may hire one or more of these remediation companies directly.

Remediation firms assess which items can be restored, which items can be repaired, and which items must be replaced. The decision is made by the remediation company and supervised by an insurance company adjuster (if assigned). However, determining the cost to replace a particular item is not easily determined. It is also difficult to estimate the final cost to repair the item at the site of the loss since the people involved may not be educated on contractual pricing and other insurance related cost matters. Further, because storage time and cost is variable, and is billed to insurance companies on a "cost plus" basis, it is difficult to determine an accurate price of repairing an item. Also, even if items are restored, they may not be accepted by the claimant/insured, which results in the insurance company paying twice: once to the remediation company for its services, and once to the claimant/insured to replace the same item.

Importantly, the interest of the remediation firm is directly opposed to that of the insurance company; the remediation firm has an interest in salvaging as many items as possible, and storing them as long as possible to maximize revenue. As a result, there is no reliable, accurate cost benefit analysis performed on these items to determine whether it is in the best interest of the insured to repair or replace a particular item.

Further, because the interests of the insurance company and the remediation firm are opposed, there is a possibility that the remediation firm will fraudulently determine that a particular item needs repair. In addition, remediation companies often subcontract repair work on items to friends and other preferred partners. Currently, there is no control or documentation over why a particular item was sent to a particular remediation firm. A corrupt individual could team up with a remediation firm to send an excessive amount of items to be restored without regard as to whether it is a good decision.

There are several systems which aid insurance companies in determining the scope and payment of incurred claims. For instance, many insurance companies utilize a communications network for processing insurance claims for vehicles and other items with parts. It consists of a network containing claim terminals and repair terminals. Identification data, which may include electronic images and other related information, is inputted into claim terminals and sent to repair terminals. Information related to costs associated with repair and replacement is returned to the claim terminal where the results can be compared. However, this system is focused on automobile insurance and is driven by its role as a communication platform to share digitalized photographs of damaged parts providing real-time connection between the claim handler and the body shop and/or parts supplier. In addition, the system does not aid in determining the salvage value of replaceable parts, nor does it prevent fraudulent transactions from occurring.

In addition, Allstate® currently utilizes a remote contents estimating system. The system is an Internet-based system for providing an estimate of the cost of settling an insurance claim. Inventory information subject to the claim is collected and a price data acquirer is used to obtain prices for replacing the inventory items from a price database or similar source. The system is meant to be a comprehensive method of resolving the entire claim and provides a means for absorbing supplemental information into the original recommended settlement and generating a new updated version. The system incorporates policy limit information and depreciation tables as part of its process for providing an estimate of the claim's resolution costs. The system considers multiple options for each item in the claim (including repair and/or cleaning costs, replacement costs, RCV/ACV, and replacement allowances) and recommends a specific solution while arriving at the estimated total claim cost.

However, there are several drawbacks associated with this system. For example, the system utilizes historical price data as a basis; it does not utilize real-time data. As a result, the values determined by this system can be erroneous. In addition, it is macro based. That is, it focuses on the claim in its entirety rather than specific, questionable items. In addition, this system does not take into account customer rejections (i.e., redundancy) or the salvage value of some items.

In light of the foregoing, there exists a clear need in the art for a system and method for the real time determination of the salvage value of items covered by a home insurance policy. In addition, there is a clear need for a system which monitors and reduces the proliferation of fraudulent claims associated with items covered by a home insurance policy.

SUMMARY OF THE INVENTION

The present invention aids an insurance adjuster in making decisions concerning covered property contents or real estate structures damaged in a loss and whether it is more effective to replace or repair a specific item. Many considerations go into this decision, including storage costs, whether the repaired item will be accepted by the insured and recoverable salvage value. The present invention utilizes a real time search engine to acquire the most current replacement costs for an item and compares it to the total associated costs of repairing the item along with any potential salvage values. Historical results regarding insured acceptance of repaired items are gathered and stored in a database to provide guidance as to the tendencies of certain items or products to be rejected by insured. A similar database details the historical salvage potential of specific items. This assists the adjuster and reduces the proliferation of "double pays." It also exerts an important control in the adjusting process, reducing the frequency or likelihood of fraud.

For example, a user can perform a query of an insure item with an outstanding claim, such as a 27" TV. In response to the query, it determines the cost to repair it, taking into account storage costs, the time value of money, and other factors to calculate a total remediation cost. The same query is directed to a database containing replacement cost values to determine the cost to replace the content item, taking into account the salvage amount that could be received if an item was replaced or not repaired.

The two points of data are then compared to determine if an item should be repaired, restored, or replaced, and can be used to better document the claim. In addition, the system is able to store historical transactions, thereby "tracking" the items, enabling a user to determine trends with particular content items that are most frequently rejected by the insured/claimant after a remediation attempt.

Accordingly, an object of the present invention is to provide a system that determines whether to repair or replace an insured item.

Still another object of the present invention is to provide a system that provides improved customer service to insured/claimant.

Another object of the present invention is to provide a system that reduces the amount of "double pay" situations.

Still another object of the present invention is to provide a system that reduces the amount of claim handler resources (i.e., restored items not accepted by claimant/insured is time consuming).

Yet another object of the present invention is to provide a system and method for reducing fraudulent insurance claims.

Yet another object of the present invention is to provide a system and method for detecting fraudulent insurance transactions.

Another object of the present invention is to provide a system and method for tracking the salvage value of an insured item.

Another object of the present invention is to provide a system and method for improved claim file documentation.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Moreover, well known methods, procedures, and substances for both carrying out the objectives of the present invention and illustrating the preferred embodiment are incorporated herein but have not been described in detail as not to unnecessarily obscure novel aspects of the present invention.

None of the terms used herein, including "item", "insured property", "property", "insured item", and the like are meant to limit the application of the invention. The terms are used interchangeably for convenience and are not intended to limit the scope of the invention. Similarly, the use of the term "insurer", "individual", "purchaser", and "corporation" is not meant to limit the scope of the invention to one type of entity, as any entity or individual can also utilize the present invention. The following presents a detailed description of a preferred embodiment of the present invention.

Figure 1:
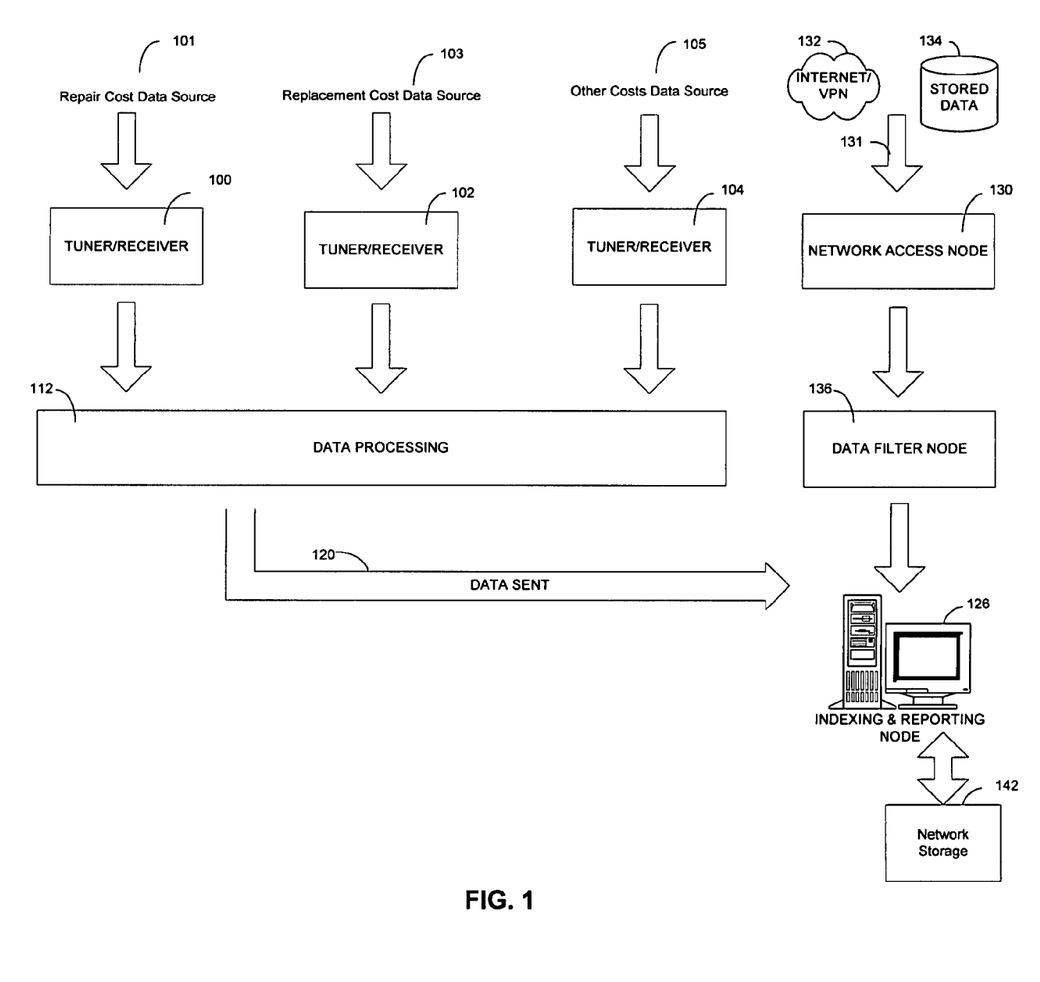
FIG. 1 is a schematic block diagram of the architecture used to implement the system in accordance with the preferred embodiment of the present invention.

Referring to the drawings wherein like numerals indicate like elements throughout, FIG. 1 is a schematic block diagram of the architecture used to implement the present system in accordance with one embodiment of the present invention. Tuner/receiver 100 receives data signals from one or more repair cost data sources 101. For example, tuner/receiver 100 may receive data from a remote location, such as an insured's home. Alternatively, tuner/receiver 100 may receive data from a corporation, an educational institution or a wireless device. Exemplary wireless devices include a cellular telephone, a portable digital assistant, a digital media storage device, a digital media playback device, a digital media transmitting device, a digital media receiving device, an iPod®, and a Blackberry®. However, any wireless device can be utilized in accordance with the present invention.

The transmission of data itself may comprise DTV, DVB, or analog signals, as well as any other transmission signal used for sending information. Information comprises anything related to the repair cost of a particular item. In addition, in the preferred embodiment, information pertaining to a particular item has data related to its geographical location, its brand name, and similarly price items. Further, information can comprise information related to consumer-generated or consumer-derived media, such as Internet discussion boards, groups, and forums, chat rooms, Internet newsgroups, web logs (blogs), personal websites, consumer ratings websites and forums, and any other public opinion, public consensus, or related information.

Similarly, tuner/receiver 102 may receive replacement cost data 103 via any transmission mechanism, including high speed optical fiber and satellite links. Tuner/receiver 104 may receive various forms of information from other data sources 105, including customer preferences, salvage value, and frequency of repaired item acceptance. Of course, as is known in the art, any information related to the insured item can be provided by any of these sources or any other source. As is common in the art, tuners/receivers 100, 102, and 104 may output the information to data processing node 112. Data processing node 112 may comprise any form of data processing, including digitizing, filtering, or any other known data processing function. Data processing node 112 outputs processed data 120 to indexing and reporting node 126.

Data processing node 112 may also comprise other processing modules to extract information from other sources. For example, data processing node 112 may comprise may comprise OCR software to extract information from print sources.

The system of the present invention can also receive data from sources such as the Internet, other third parties, print media, etc. In the embodiment depicted in FIG. 1, this data is received by network access node 130 from Internet VPN 132 and stored data 134. Network access node 130 may also access a broad array of external data. Stored data 134 may be maintained by any third-party. For example, stored data 134 may comprise market or product data, academic data from other institutions, users or teachers, and other stored analyses and product information. Stored data 134 may additionally comprise search or keyword criteria and various forms of comparison data. Internet/VPN 132 may be a source of continuous Internet media, such as web logs (blogs), forums, chat rooms, newsgroups, electronic bulletin boards, etc., which all may be accessed by the system of the present invention.

In the preferred embodiment, network access node 130 comprises high-speed fiber optic OC-3 data link 131 to Internet/VPN 132 and stored data 134, but any network access mechanism exhibiting any data transfer rate may be utilized, as appropriate. OC-3 data link 131 is preferred because it allows for faster transfer of data from Internet VPN 132 and stored data 134. Data received via network access node 130 is screened by data filter node 136. Data filter node 136 may comprise a packet filter, firewall, or other network filtering device that processes incoming network data from the network access stream. Data filter node 136 and network access node 130 may optionally be integrated within indexing and reporting node 126.

Indexing and reporting node 126 analyzes all incoming data streams for relevant information. Indexing and reporting node 126 may additionally utilize data from various other sources. Relevant information may be indexed, catalogued, or stored within indexing and reporting node 126 or network storage 142. Due to the potentially voluminous size of the captured data, well-known video and data compression schemes are typically implemented. Indexing and reporting node 126 may also generate various related reports and analyses pertaining to the captured data.

In the preferred embodiment of the present invention, data sources 101, 103, and 105 are continually monitored and processed 112 in real time. As a result, data stored in network storage 142 is continuously updated to reflect the most current data related to repair costs, replacement costs, and other costs.

Figure 2:
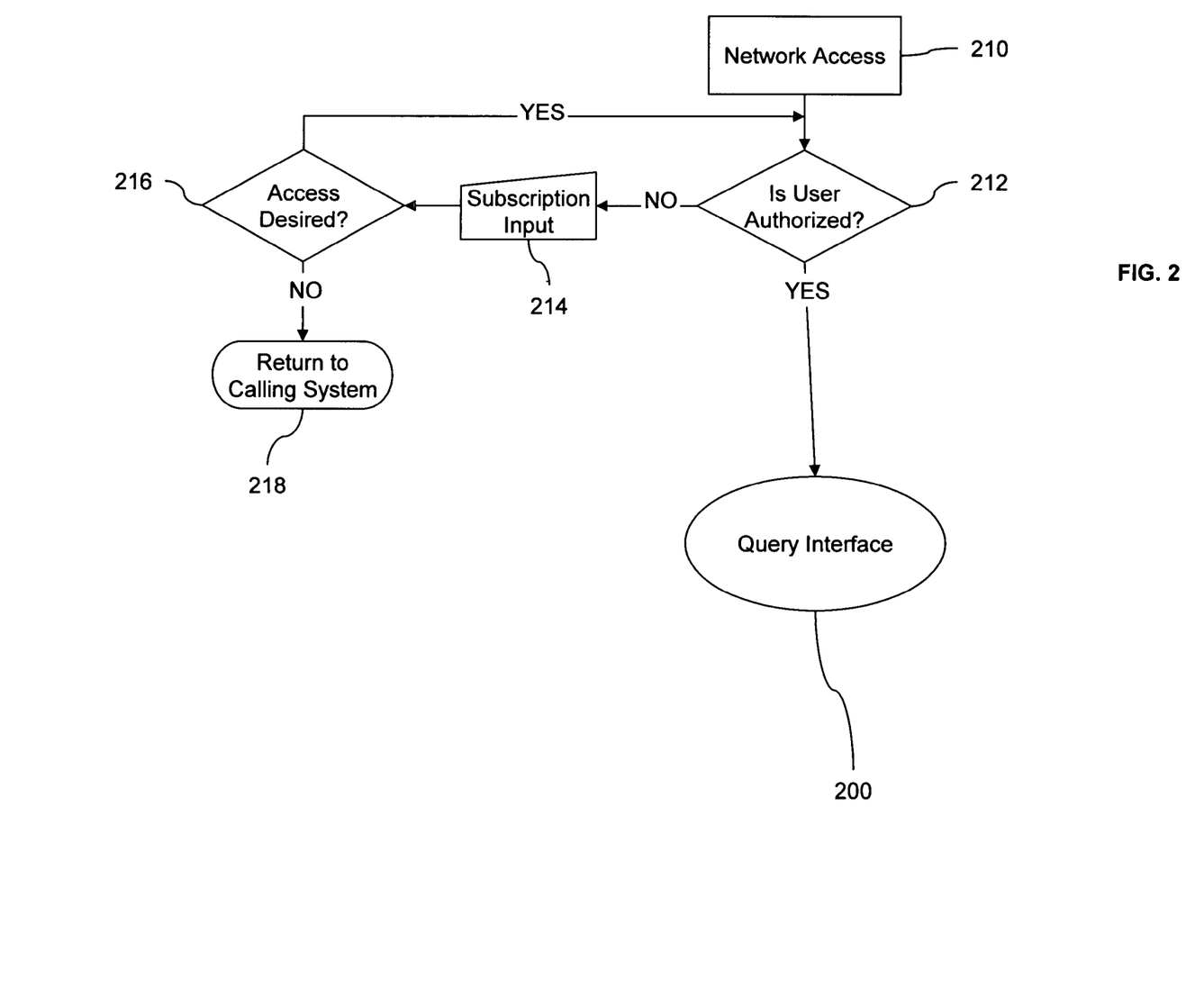
FIG. 2 is a flow diagram of a routine for accessing the system in accordance with the preferred embodiment of the present invention.

The present invention utilizes the above described architecture for a specific platform directed to performing a query as illustrated in FIG. 2. The query interface 200 consists of a number of fields pertaining to an insured item, including make, model number, age, and condition. In the preferred embodiment, the query interface operates with a plurality of searchable fields that can be searched with Boolean expressions as is known in the art.

To access the query interface, a user accesses the network at network access stage 210. This typically involves establishing a connection to the system of the present invention via a public network connection (e.g., the Internet), or via private network access (e.g., via VPN). For additional security, this connection may be encrypted or secure. A user accessing the system is authorized at authorization stage 212. This step may comprise the submission of a username and password combination or any other conditional access technique common in the art. Users may also establish "guest" accounts to allow others limited access to the system.

If the user is not presently authorized, and is not a guest, the user may subscribe to the service at subscription input 214. After subscription input 214 is submitted, the present invention may determine if access to the service is now desired at access desired stage 216. If access to the service is not desired, the system returns the user to the calling system or web page at return stage 218. If access is desired, stage 216 returns a user to authorization stage 212 so that the user may login to the service.

After a user successfully logs into the system, the user can access query interface 200. Although the MICROSOFT INTERNET EXPLORER web browser is the preferred medium for the interface, any other media known in the art are available for allowing user access to the system such as, but not limited to AOL BROWSER web browser, the FIREFOX web browser, the NETSCAPE web browser, MOZILLA web browser, OPERA web browser, and the like.

Figure 3:
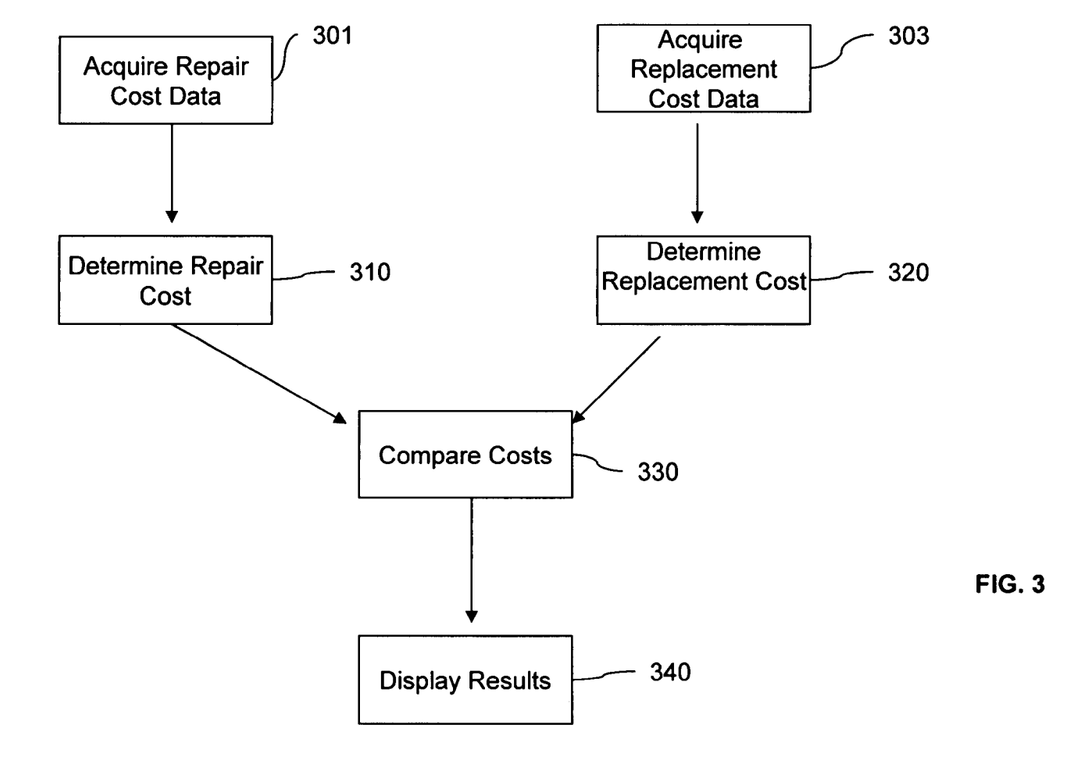
FIG. 3 is a flow diagram of a method of determining whether to repair or replace an insured item in accordance with the preferred embodiment of the present invention.

FIG. 3 depicts the flow diagram of a method of determining whether to repair or replace an insured item in accordance with the preferred embodiment of the present invention. Initially, a user enters a query from a remote location (not shown) discussed in greater detail below. The query pertains to a particular item which is insured and has an outstanding claim. In response, the system acquires data related to the costs to repair the insured item and acquires data related to the costs to replace the insured item as depicted by 301 and 303, respectively.

More specifically, in response to a query from a user, the system searches the appropriate databases, accesses the information, and downloads it to a node for processing (not shown). In the preferred embodiment, the data acquired represents current, real time repair costs and replacement costs. The processing node determines both the cost to repair the insured item 310 and the cost to replace the item 320, each of which is described in greater detail with reference to FIGS. 4-5 below.

Figure 4:
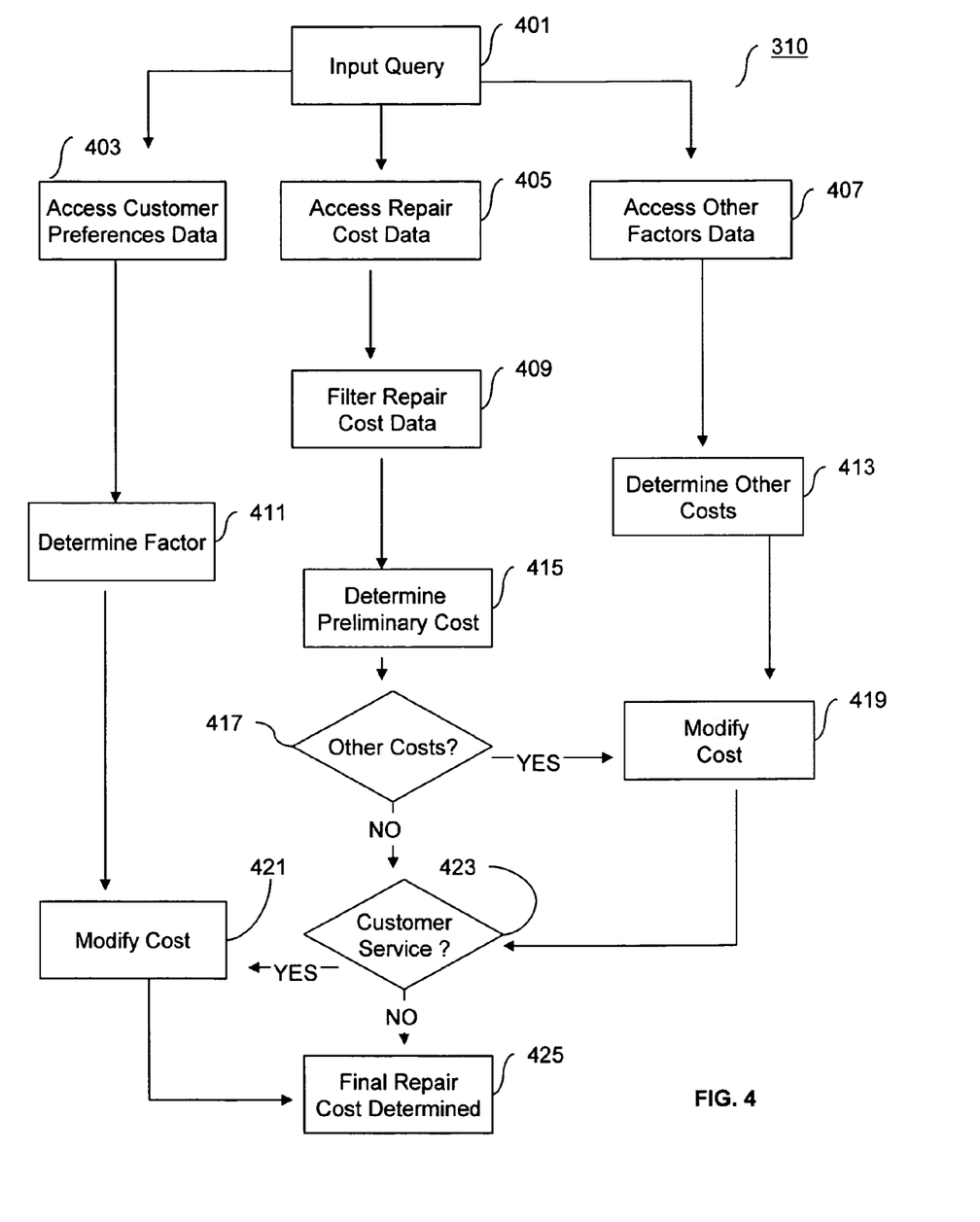
FIG. 4 depicts a flow diagram of the method of determining the repair cost of an insured item in accordance with the preferred embodiment of the present invention.

FIG. 4 is a flow diagram depicting the method of determining the repair cost 310 of an insured item in accordance with the preferred embodiment of the present invention. To determine the cost to repair a particular item, a user first enters a query into query interface 200 as depicted by 401. In the preferred embodiment, the query entry comprises a series of Boolean terms. Alternatively, query interface 200 comprises a series of drop down boxes as is known in the art. Of course, any other query interface can be used in accordance with the present invention.

In response to the data entered of inputted query 401, the system accesses a series of databases with information pertaining to the item queried. In this example, the query directs the system to access customer preferences data as depicted by 403, access repair cost data as depicted by 405, and access other factors data as depicted by 407. The data is gathered and stored in a manner as previously discussed with regards to FIG. 1.

After accessing the various data sources 403-407, the system filters the data. In this example, only repair cost data is filtered as depicted by 409. However, any other source of data can be filtered (not shown). The data is filtered utilizing specific terms as inputted by the query. For example, a user can query for a new television and refine the analysis by adding terms related to its age, its geographic location, or its brand name. The system utilizes those terms to refine the accessed data. The refined data is then sorted by relevancy and stored in a temporary database.

After filtering the relevant data, it is used to determine a particular characteristic for a given insured item. In this example, the system determines an appropriate factor related to customer preferences as depicted by 411, determines the preliminary repair cost as depicted by 415, and determines other costs as depicted by 413.

In this example, determined repair cost data 415 comprises information related to the repair cost for a particular queried item. For example, the cost to repair a particular item with the queried characteristics can be directly retrieved from the filtered data stored in the temporary database. The system then compares the data and ranks the alternatives. In the preferred embodiment, the system ranks the alternatives from cheapest to most expensive. Of course, any ranking system can be utilized in accordance with the preferred embodiment. For example, a user can input the query information: "used" "27" Sony Trinitron television", "expected to take 3 weeks to repair" "at or near Hartford, Conn." In response, the system accesses data related to the repair cost of televisions and filters the data accordingly, storing the most relevant results in a temporary database.

The system then determines whether there is data related to other costs of the particular queried item as depicted by 417. If data is available, it modifies the preliminary cost as depicted by 419 by applying previously determined other costs 413.

In this example, determined other costs data 413 comprises information related to the additional costs incurred for a particular queried item. For example, the additional costs can be calculated based on the anticipated repair time. More specifically, the anticipated repair time can be utilized to determine additional storage costs and a net present value factor to account for the time-value of money. In addition, other information can be included, such as shipping costs for a particular item.

In this example, the system modifies the repair cost by adding shipping costs, storage costs, and any other associated costs. Then the system multiplies the costs by the net present value factor to account for the time value of money. This can be represented by the equation:

$$(\Sigma C_i) \cdot NPV$$

where $C_i$=a cost associated with an item
and NPV=the Net Present Value Factor.

If the system does not have data related to other costs, it determines whether data is available for customer service. If it is available, the system modifies the cost by applying the appropriate factor as depicted by 421.

In this example, determined customer preferences data factor 411 comprises information related to the frequency with which a customer rejects or accepts a particular queried item. For example, the system can determine that a customer with an item matching the query information: "used" "27" Sony Trinitron television", "expected to take 3 weeks to repair" "at or near Hartford, Conn." accepts the particular item with a particular probability. The factor can be measured through observation and entered into the appropriate database, statistically derived by the system itself, or entered manually by a user into the database or query.

In this example, the system modifies the total repair cost by multiplying the costs by the appropriate factor. This can be represented by the equation:

$$[(\Sigma C_i) \cdot NPV] \cdot F$$

where
$C_i$=a cost associated with an item
NPV=the Net Present Value Factor
and F=Customer Service Factor.

Alternatively, a user can instruct the system to not take other costs and customer service into consideration when the query is inputted 401. In this manner, a user can determine the cost simply to repair the item. Then, the user can perform a second query allowing other costs and customer service to be accounted for. In this manner, a user can obtain segmented data which can be statistically analyzed.

For example, a user can run a query and determine that the cost to repair an item is $100 without taking into consideration other factors. However, when customer service and/or other costs are considered, the total price is $500. As a result, the user can readily determine that customer service and other costs account for approximately 80% of the cost to repair the particular item. This allows the user to identify potential inefficiencies in its overall repair policy.

After modifying the preliminary cost 415 by any appropriate cost, the computer determines the final cost and stores it in a temporary database for analysis as described below with regard to FIG. 3.

Figure 5:
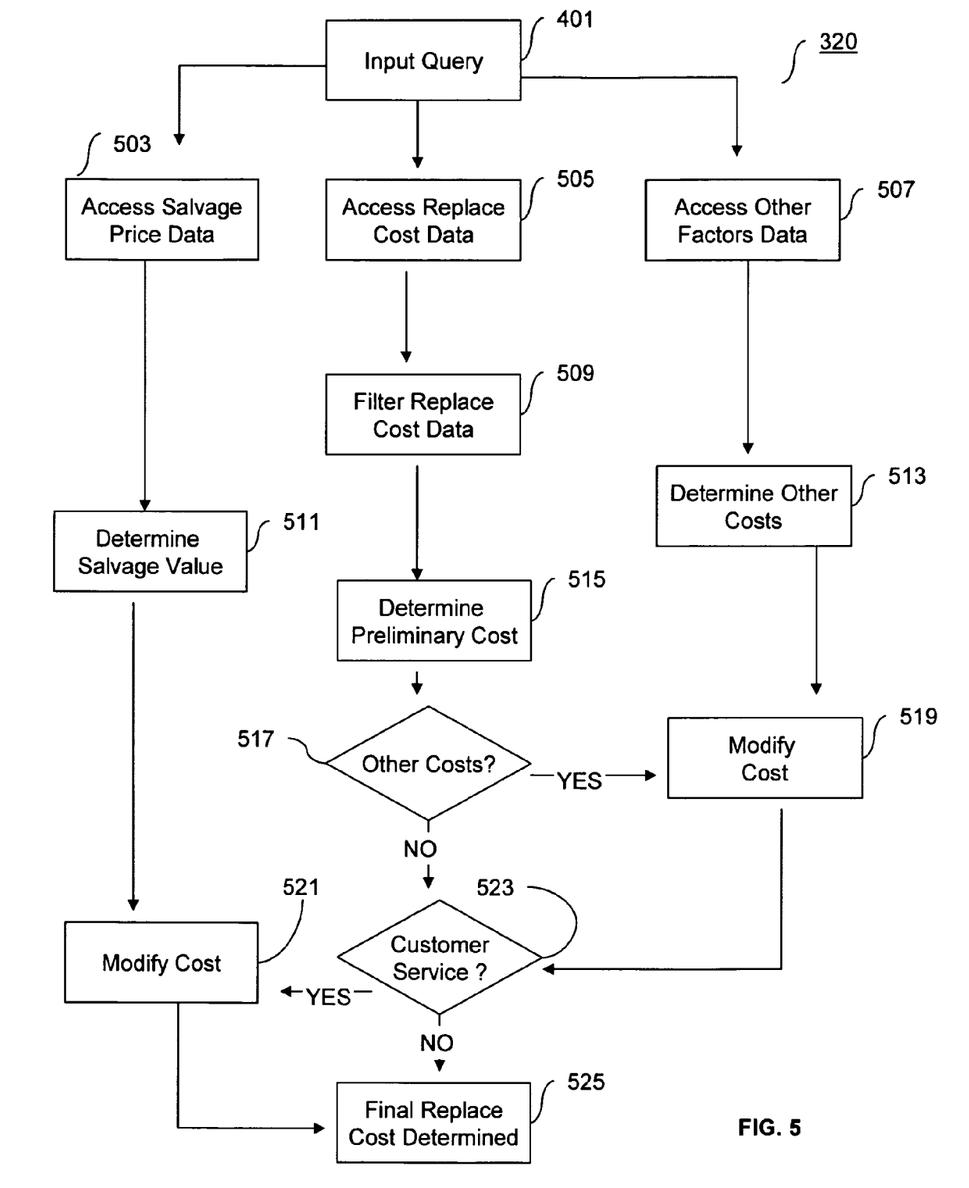
FIG. 5 depicts a flow diagram of the method of determining the replacement cost of an insured item in accordance with the preferred embodiment of the present invention.

FIG. 5 is a flow diagram depicting the method of determining the replacement cost of an insured item in accordance with the preferred embodiment of the present invention. Similar to determining the repair cost of a particular item, a user first enters a query into query interface 200 as depicted by 401. As previously discussed, in the preferred embodiment, the query entry comprises a series of Boolean terms. Alternatively, query interface 200 comprises a series of drop down boxes as is known in the art. Of course, any other query interface can be used in accordance with the present invention.

In response to the data entered of inputted query 401, the system accesses a series of databases with information pertaining to the item queried. In this example, the query directs the system to access salvage price data as depicted by 503, access replacement cost data as depicted by 505, and access other factors data as depicted by 507. The data is gathered and stored in a manner as previously discussed with regards to FIG. 1.

After accessing the various data sources 503-507, the system filters the data. In this example, only replacement cost data is filtered as depicted by 509. However, any other source of data can be filtered (not shown). The data is filtered utilizing specific terms as inputted by the query. For example, a user can query for a new television and refine the analysis by adding terms related to its age, its geographic location, or its brand name. The system utilizes those terms to refine the accessed data. The refined data is then sorted by relevancy and stored in a temporary database.

After filtering the relevant data, the data is used to determine a particular characteristic for a given insured item. In this example, the system determines the salvage value as depicted by 511, determines the preliminary replacement cost as depicted by 515, and determines other costs as depicted by 513.

In this example, determined replacement cost data 515 comprises information related to the repair cost for a particular queried item. For example, the cost to repair a particular item with the queried characteristics can be directly retrieved from the filtered data stored in the temporary database. The system then compares the data and ranks the alternatives. In the preferred embodiment, the system ranks the alternatives from cheapest to most expensive. Of course, any ranking system can be utilized in accordance with the preferred embodiment. For example, a user can input the query information: "used" "27" Sony Trinitron television", "expected to take 3 weeks to repair" "at or near Hartford, Conn." In response, the system accesses data related to the repair cost of televisions and filters the data accordingly, storing the most relevant results in a temporary database.

The system then determines whether there is data related to other costs of the particular queried item as depicted by 517. If data is available, it modifies the preliminary cost as depicted by 519 by applying previously determined other costs 513.

In this example, determined other costs data 513 comprises information related to the additional costs incurred for a particular queried item. For example, shipping costs, delivery costs, and order processing costs for a particular item can be included.

In this example, the system modifies the repair cost by adding the other associated costs. Then the system multiplies the costs by the net present value factor to account for the time value of money. This can be represented by the equation:

$$(\Sigma C_i) \cdot NPV$$

where $C_i$=a cost associated with an item
and NPV=the Net Present Value Factor.

If the system does not have data related to other costs, it determines whether data is available related to the salvage value of a particular item. If it is available, the system modifies the cost by subtracting the salvage value 521.

In this example, determined salvage value 411 comprises related to the repair cost for a particular queried item. For example, the cost to repair a particular item with the queried characteristics can be directly retrieved from the filtered data stored in the temporary database. The system then compares the data and ranks the alternatives. In the preferred embodiment, the system ranks the alternatives from most expensive to cheapest. In this example, the system modifies the total replacement cost by subtracting the appropriate salvage value. This can be represented by the equation:

$$[(\Sigma C_i) \cdot NPV] - C_s$$

where
$C_i$=a cost associated with an item
NPV=the Net Present Value Factor
and $C_s$=Salvage Value.

Alternatively, a user can instruct the system to not take other costs and salvage value into consideration when the query is inputted 401. In this manner, a user can determine the cost simply to replace the item. Then, the user can perform a second query allowing other costs and salvage value to be accounted for.

For example, a user can run a query and determine that the cost to replace an item is $100 without taking into consideration other factors. However, when other costs are considered, the total price is $500. Further, it can be determined that the salvage value is $75. As a result, the user can readily determine that other costs account for approximately 80% of the cost to replace the particular item, which is only partially offset by the salvage value of the item. This allows the user to identify potential inefficiencies in its overall replacement policy.

Similarly, the system allows a user to monitor for potentially inefficient and/or fraudulent claims by eliminating subjective factors such as collusion and/or nepotism. For example, a user can determine that the cheapest alternative (based on inputted query 401) to repair an item is from "Company X." However, if the remediation company suggests "Company Y" on a recurring basis, and the remediation frequently suggests the use of "Company Y," the user can identify a potential inefficiency and investigate further.

In addition, the present invention reduces the number of instances of improper remediation by a remediation company. Typically, after a claim is made, a remediation company gathers up as many articles as it can in order to repair them without performing any analysis as to whether the item should be repaired because it is in its best interest to do so (i.e., the remediation company will get paid for every item it repairs, regardless of whether it should be). However, the present invention curtails this practice by reducing the number of inaccurately repaired items, reducing the overall costs associated with replacing and/or repairing items.

After modifying the preliminary cost 515 by any appropriate cost, the computer determines the final cost and stores it in a temporary database for analysis as described below.

After determining the repair cost 310 and determining the replacement cost 320 in the manner described, the processing node compares the cost of each alternative as depicted by 330. Any means of comparison can be utilized, however, in the preferred embodiment, the processing node compares the overall cost to repair the item with the overall cost to replace the item. After comparing the costs of each alternative 330, the processing node chooses the most cost effective alternative (i.e., the cheaper alternative).

The results of the comparison are electronically sent to query interface 200 and displayed to the user as depicted by 340. In the preferred embodiment, the display is simply a message such as "repair item at location X" or "replace item by purchasing item from location Y." However, any display which reports the results of the comparison can be utilized in accordance with the present invention. For example, query interface 200 can display the results of the 10 cheapest repair options along with the results with the 10 cheapest replacement options. It is contemplated that any other method of displaying the results of the comparison can be utilized in accordance with the present invention.

In an embodiment, a method for determining whether to repair or replace an insured item of an insured user includes: acquiring information related to the repair cost of at least one insured item with an outstanding insurance claim; determining the repair cost of the at least one insured item with an outstanding insurance claim; acquiring information related to the replacement cost of the at least one insured item with an outstanding insurance claim; determining the replacement cost of the at least one insured item with an outstanding insurance claim; comparing the replacement cost of the at least one insured item with an outstanding insurance claim to the repair cost of the at least one insured item with an outstanding insurance claim; and determining whether to repair or replace the at least one insured item with an outstanding insurance claim.

In an embodiment the method may also include the step of acquiring information related to the salvage value of the at least one insured item with an outstanding insurance claim. In an embodiment the method may also include a step of determining the salvage value of the at least one insured item with an outstanding insurance claim. In an embodiment, the step of acquiring information related to the repair cost of at least one insured item with an outstanding insurance claim may occur in real-time. In an embodiment, the step of acquiring information related to the repair cost of at least one insured item with an outstanding insurance claim may occur by utilizing the Internet. In an embodiment, the step of acquiring information related to the replacement cost of at least one insured item with an outstanding insurance claim may occur in real-time. In an embodiment, the step of acquiring information related to the replacement cost of at least one insured item with an outstanding insurance claim may occur by utilizing the Internet. In an embodiment, the step of acquiring information related to the salvage value of at least one insured item with an outstanding insurance claim may occur in real-time. In an embodiment, the step of acquiring information related to the salvage value of at least one insured item with an outstanding insurance claim occurs by utilizing the Internet.

In an embodiment, a method for determining whether to repair or replace an insured item of an insured user using a web-based system including a server with at least one database and at least one device connected to the server via a network, may include the steps of: storing information related to the repair cost of the insured item in a database; storing information related to the replacement cost of the insured item in a database; receiving a query from an insurer or agent at the server, pertaining to the insured item; retrieving the information related to the repair cost of the insured item from the database in response to the received query; retrieving the information related to the replacement cost of the insured item from the database in response to the received query; comparing the retrieved information related to the replacement cost of the insured item with the retrieved information related to the repair cost of the insured item; and determining whether to repair or replace the at least one insured item.

In an embodiment, the information related to the repair cost of the insured item in a database comprises historical data. In an embodiment, the information related to the replacement cost of the insured item in a database comprises historical data. In an embodiment, the method may also include the step of storing information related to the salvage value of the insured item in a database. In an embodiment, the information related to the salvage value of the insured item in a database comprises historical data. In an embodiment, the method may also include the step of storing information related to the rate of customer acceptance of the insured item which has been repaired. In an embodiment, the method may also include the step of updating the information related to the repair cost of the insured item in a database in real time. In an embodiment, the method may also include the step of updating the information related to the replacement cost of the insured item in a database in real time. In an embodiment, the method may also include a step of displaying the result of the step of determining whether to repair or replace the insured item to the at least one device. In an embodiment, the step of retrieving the information related to the repair cost of the insured item from the database in response to the received query may occur in real time. In an embodiment, the step of retrieving the information related to the replacement cost of the insured item from the database in response to the received query may occur in real time.

What is claimed is:

1. A computer system for determining whether to repair or replace an insured item in the nature of personal property, insured under an insurance policy, comprising:
   a computer processor, and
   one or more databases in one or more data storage devices accessible by the computer processor;
   the computer processor being configured to:
      access from the one or more databases data indicative of the repair cost of the personal property, including an estimated cost of repair and a probability of acceptance by the insured of the personal property if repaired, the probability of acceptance having a value in a range from zero to one, inclusive;
      determine the repair cost of the personal property by multiplying the estimated cost of repair by a factor based on the probability of acceptance by the insured, the factor based on the probability of acceptance having a value of one for a value of the probability of acceptance equal to one and a value of greater than one for a value of the probability of acceptance less than one;
      access from the one or more databases a cost of a replacement for the personal property and a salvage value of the personal property;
      determine the replacement cost of said personal property based on at least the cost of the replacement for the personal property and the salvage value of the personal property;
      compare said replacement cost of said personal property to said repair cost of said personal property; and
      determine, responsive to determining in the comparing of said replacement cost to said repair cost, that the replacement cost is greater than the repair cost, that repair of said personal property fulfills an obligation of the insurer to the insured at the lowest cost, and, determine, responsive to determining in the comparing that the repair cost is greater than the replacement cost, determine that replacement of said personal property fulfills an obligation of the insurer at the lowest cost; and
      store in the one or more databases data indicative of the lowest cost determination.

2. The system of claim 1, wherein the computer processor is further configured to modify the repair cost by adding one or both of storage costs and shipping costs.

3. The system of claim 1, wherein the computer processor is further configured to modify the repair cost to a net present value of the repair cost employing an estimated time to repair the item as a duration in determining the net present value of the repair cost.

4. The system of claim 1, further comprising a display device and wherein said computer processor is in communication with said display device and is further configured to provide data indicative of the lowest cost determination to the display device for display.

5. The system of claim 1, wherein said one or more databases are remotely located from said computer processor and said computer processor is further configured to access said one or more databases via a communications network.

6. A computer-implemented method for determining whether to repair or replace personal property insured under an insurance policy, said method comprising the steps of:
   acquiring by a computer system data indicative of an estimated cost of repair and a probability of acceptance by the insured of the personal property if repaired, the probability of acceptance having a value in a range from zero to one, inclusive, via communications over a network with one or more data storage devices storing data;
   determining by the computer system a repair cost of said personal property, based on at least the determined estimated cost of repair multiplied by a factor based on the probability of acceptance, the factor based on the probability of acceptance having a value of one for a value of the probability of acceptance equal to one and a value of greater than one for a value of the probability of acceptance less than one;
   acquiring by the computer system data indicative of a cost of a replacement for the personal property and a salvage value of the personal property;
   determining by the computer system a replacement cost of said personal property, based on at least the cost of the replacement for the personal property less the salvage value of the personal property;
   comparing by the computer system said determined replacement cost of said personal property to said determined repair cost of said personal property;
   determining by the computer system, responsive to determining in the comparing of the replacement cost and the repair cost, that the replacement cost is greater than the repair cost, that repair of said personal property fulfills an obligation of the insurer to the insured at the lowest cost, and determining by the computer system, responsive to determining in the comparing of the replacement cost and the repair cost, that the repair cost is greater than the replacement cost, that replacement of the personal property fulfills an obligation of the insurer at lowest cost; and
   displaying on a display of the computer system the lowest cost determination.

7. The system of claim 1, wherein the insured item is an item of personal property, and the insurance policy is a homeowners insurance policy.

8. The method of claim 6, wherein one or both of said steps of acquiring the estimated cost of repair and acquiring the salvage value of the personal property occurs in real-time.

9. The method of claim 8, wherein one or both of said steps of acquiring the estimated cost of repair and acquiring the salvage value of the personal property occurs by utilizing the Internet.

10. The method of claim 6, wherein the step of determining the repair cost includes modifying the repair cost by adding one or both of shipping costs and storage costs.

11. The method of claim 6, further comprising the step of modifying the repair cost to a net present value of the repair cost employing an estimated time to repair the personal property as a duration in determining the net present value of the repair cost.

12. The method of claim 6, further comprising the step of:
   acquiring data indicative of the personal property including one or more of make, model, and age,
   and wherein said data indicative of the personal property is employed in one or more of the steps of acquiring the estimated repair cost, acquiring the probability of acceptance, acquiring the replacement value, and acquiring the salvage value.

13. A method for determining whether to repair or replace an insured item in the nature of personal property, insured under an insurance policy, using a web-based system including a server computer with one or more databases and at least one device connected to the server computer via a network, said method comprising the steps of:

storing by the server computer in the one or more databases data indicative of the repair cost of said personal property, including an estimated cost of repair of the personal property and a probability of acceptance by the insured of the personal property if repaired, the probability of acceptance having a value in a range from zero to one, inclusive;

storing by the server computer in the one or more databases data indicative of the replacement cost of said personal property, including a cost of a replacement for the personal property and a salvage value of the personal property;

receiving at the server computer a query pertaining to said personal property;

retrieving by the server computer said data indicative of the repair cost of said personal property from said one or more databases in response to said received query;

determining by the server computer the repair cost of said personal property item employing the estimated cost to repair multiplied by a factor based on the probability of acceptance by the insured of the personal property if repaired, the factor based on the probability of acceptance having a value of one for a value of the probability of acceptance equal to one and a value of greater than one for a value of the probability of acceptance less than one;

retrieving by the server computer said data indicative of the replacement cost of said personal property from said one or more databases in response to said received query;

determining by the server computer the replacement cost of said personal property based on the cost of the replacement for the personal property less the salvage value of the personal property;

comparing by the server computer said determined replacement cost of said personal property with said determined repair cost of said personal property;

determining, by the server computer, based on the comparing of the determined replacement cost and the determined repair cost, the one of repair or replacement of said personal property that fulfills an obligation of the insurer at lowest cost; and     storing, by the server computer, data indicative of the lowest cost determination.

14. The method of claim 13, further comprising the step of:
    updating in real time one or both of said data indicative of the repair cost of said personal property in a database and said data indicative of the replacement cost of said personal property in a database.

15. The method of claim 13, further comprising the step of:
    displaying to the at least one device the result of said step of determining whether to repair or replace said personal property.

16. The method of claim 13, wherein one or both of said steps of retrieving said data indicative of the repair cost of said personal property from said database in response to said received query and retrieving said data indicative of the replacement cost of said personal property from said database in response to said received query occurs in real time.

* * * * *